US012112661B2

(12) United States Patent
Morin et al.

(10) Patent No.: US 12,112,661 B2
(45) Date of Patent: Oct. 8, 2024

(54) RETRACTABLE DISPLAY DEVICE (71) Applicant: InterDigital Madison Patent Holdings, SAS, Paris (FR)

(72) Inventors: Thomas Morin, Rennes (FR); Sebastien Fraleu, Noyal sur Vilaine (FR); Goulven Querre, Noyal sur Vilaine (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 880 days.

(21) Appl. No.: 16/982,833

(22) PCT Filed: Mar. 19, 2019

(86) PCT No.: PCT/EP2019/056853
§ 371 (c)(1),
(2) Date: Sep. 21, 2020

(87) PCT Pub. No.: WO2019/180027
PCT Pub. Date: Sep. 26, 2019

(65) Prior Publication Data
US 2021/0056874 A1    Feb. 25, 2021

(30) Foreign Application Priority Data
Mar. 21, 2018  (EP) ..................... 18305311

(51) Int. Cl.
*G09F 9/37*   (2006.01)
*F16M 11/04*   (2006.01)
(Continued)

(52) U.S. Cl.
CPC .......... *G09F 9/375* (2013.01); *F16M 11/046* (2013.01); *F16M 11/18* (2013.01); *G09F 9/301* (2013.01); *H04M 1/0268* (2013.01)

(58) Field of Classification Search
CPC ...... G09F 9/375; G09F 9/301; G09F 15/0062; G09F 15/0068; G09F 11/30;
(Continued)

(56) References Cited

U.S. PATENT DOCUMENTS 7,134,230 B1    11/2006  Boens et al.
7,397,603 B2 *   7/2008  Peterson ................ G03B 21/10
                                                    160/354
(Continued)

FOREIGN PATENT DOCUMENTS

CN    105946210 A    9/2016
CN    106601137 A    4/2017
(Continued)

*Primary Examiner* — David R Dunn
*Assistant Examiner* — Christopher E Veraa
(74) *Attorney, Agent, or Firm* — CONDO ROCCIA KOPTIW LLP (57) ABSTRACT

The disclosure relates to retractable display device (1) including a housing (3) having an internal space (31) defined therein, a rolling axle (32) positioned in the housing (3), an electronic display and a support structure (21) attached to a rear surface of the electronic display. The support structure (21) includes a plurality of juxtaposed support elements (210) capable of being rolled around the axle (32) with the electronic display in a storage position and of being unrolled upward, at least partially out of the housing (3), to provide a substantially planar front surface on which visual information may be displayed.

20 Claims, 4 Drawing Sheets

(51) Int. Cl.
*F16M 11/18* (2006.01)
*G09F 9/30* (2006.01)
*H04M 1/02* (2006.01)

(58) Field of Classification Search
CPC ... F16M 11/046; F16M 11/18; H04M 1/0268; H05K 7/16; H05K 5/0217
See application file for complete search history.

(56) References Cited

U.S. PATENT DOCUMENTS

| | | | |
|---|---|---|---|
| 7,437,842 B2 | 10/2008 | Sgambellone | |
| 7,463,238 B2 | 12/2008 | Funkhouser et al. | |
| 7,636,085 B2 | 12/2009 | Yang | |
| 7,821,479 B2 | 10/2010 | Zhang | |
| 7,864,418 B2* | 1/2011 | Kuroi | F16M 11/38 359/443 |
| 8,184,369 B2* | 5/2012 | Kuroi | G03B 21/58 359/461 |
| 9,772,657 B2* | 9/2017 | Takayanagi | H04M 1/0268 |
| 9,864,412 B2* | 1/2018 | Park | G06F 1/1652 |
| 10,257,945 B2* | 4/2019 | Kim | H05K 1/147 |
| 10,410,549 B1* | 9/2019 | Kim | H10K 50/84 |
| 10,420,227 B2* | 9/2019 | Lee | H04M 1/0268 |
| 10,424,229 B2* | 9/2019 | Kim | H04M 1/0268 |
| 10,664,017 B2* | 5/2020 | Kim | H10K 59/40 |
| 2004/0183958 A1* | 9/2004 | Akiyama | G09F 9/30 349/58 |
| 2007/0241002 A1 | 10/2007 | Wu et al. | |
| 2011/0043976 A1* | 2/2011 | Visser | G09F 9/301 361/679.01 |
| 2012/0002357 A1* | 1/2012 | Auld | G09F 11/30 361/679.01 |
| 2012/0204453 A1* | 8/2012 | Jung | G09F 9/301 40/517 |
| 2016/0231843 A1 | 8/2016 | Kim et al. | |
| 2016/0374228 A1* | 12/2016 | Park | G09F 9/301 |
| 2017/0156225 A1* | 6/2017 | Heo | G06F 1/1681 |
| 2017/0358636 A1* | 12/2017 | Kim | H10K 50/84 |
| 2019/0098774 A1* | 3/2019 | Park | G09F 9/301 |

FOREIGN PATENT DOCUMENTS

| | | |
|---|---|---|
| FR | 2 945 425 A1 | 11/2010 |
| WO | WO 2010054380 A2 | 5/2010 |

* cited by examiner

RETRACTABLE DISPLAY DEVICE

CROSS REFERENCE TO RELATED APPLICATIONS

This application is the national stage entry under 35 U.S.C. § 371 of International Application PCT/EP2019/056853, filed Mar. 19, 2019, which was published Sep. 26, 2019 in accordance with PCT Article 21(2), in English, and which claims the benefit of European Patent Application No. 18305311.5 filed Mar. 21, 2018.

TECHNICAL FIELD

The present principles relate generally to display devices and, more specifically, to a rollable display screen for a display device.

BACKGROUND ART

As a part of the rapid development of electronic technologies, various display devices such as, for example, televisions (TVs) are in use.

Recently, efforts have been made to develop large screen TVs having LCDs (liquid crystal displays) or LEDs (light emitting diodes) display screen. While many large screen TVs are used in residential or private environments, large screen TVs also have a range of business-related applications (office lobby or waiting areas, meeting spaces, hospitality areas, restaurants, bars, or retail companies). Most current display devices are of a rigid fixed structure.

The size of the display screens for such display devices is thus not adjustable so that they may not be suitable for certain applications and programs.

In parallel, there are increasingly progressing and intensive researches on the technologies of flexible display screens (soft screens). Such flexible display screens may be bent, folded, or rolled up without damaging the flexible display.

SUMMARY

The present principles provide a retractable display device including a housing having an internal space defined therein, a rolling axle positioned in the housing, an electronic display and a support structure attached to a rear surface of the electronic display and capable of supporting the electronic display, wherein said support structure includes a plurality of juxtaposed support elements being capable of being rolled around said axle with said electronic display in a storage position and of being deployed or unrolled upward, at least partially out of the housing, to provide a substantially planar surface on which visual information may be displayed. The principles thus provide a large screen display device that can be rolled, so as to reduce the size of the display device, such as a television. A user is able to adjust the size of a viewing screen by adjusting the length of the flexible display screen that is unrolled.

According to an aspect of the present principles, wherein a front surface of said electronic display defines a display panel.

According to another aspect of the present principles, said support structure includes one supporting bar or a plurality of parallel supporting bars extending vertically on the rear surface of said electronic display when unrolled, each of said supporting bars including a plurality of juxtaposed support elements.

According to another aspect of the present principles, said support structure includes a supporting web extending vertically on the rear surface of said electronic display when unrolled, said supporting web including a plurality of juxtaposed elongated support elements.

According to another aspect of the present principles, said each of said support elements carries at least one light element, the set of light elements of the support structure defining said display surface.

According to another aspect of the present principles, each of said support elements carries a matrix of light elements.

According to another aspect of the present principles, said juxtaposed support elements are joined or connected together by linking elements.

According to another aspect of the present principles, said support elements carry magnets on opposite upper and lower edges for straightening the support structure by magnetic forces when the support structure is deployed.

According to another aspect of the present principles, the retractable display device includes a pullable tension cable going through the support elements for sticking the latter together when the support structure is deployed out of the housing.

According to another aspect of the present principles, the housing includes a rotating guide capable of guiding upward with an inclination the support structure and display surface when unrolled out of the housing, and capable of straightening in vertical position the support structure and display surface once deployed at least partially out of the housing.

According to another aspect of the present principles, the housing includes a plurality of movable guides located around said axle and configured to retract and compactly stow support structure and display surface when rolled inside said housing.

According to another aspect of the present principles, the shape of the upper and lower edges of each of said support elements is configured so that the juxtaposed support elements fit into each other when the support structure and display surface are deployed at least partially out of the housing.

According to another aspect of the present principles, a first edge of each of said support element includes a groove having a triangular section and extending longitudinally, the second opposite edge including a tip having a triangular section and extending longitudinally, the tip of a support element being configured to fit into the groove of an adjacent support element when the support structure and display surface are deployed at least partially out of the housing.

According to another aspect of the present principles, the angle between the inclined surfaces of the groove and the angle between the inclined surfaces of the tip are each substantially equal to 90°.

According to another aspect of the present principles, said first edge of each of said support elements also includes a lip having a semi-circular section and extending longitudinally, said second opposite edge also including a notch having a semi-circular section and extending longitudinally, the lip of a support element being configured to fit into the notch of an adjacent support element when the support structure and display surface are deployed at least partially out of the housing.

The object and advantages of the present principles will be realized and attained by means of the elements and combinations particularly pointed out in the claims.

It is to be understood that both the foregoing general description and the following detailed description are exemplary and explanatory and are not restrictive of the principles, as claimed.

While not explicitly described, the present embodiments may be employed in any combination or sub-combination.

BRIEF DESCRIPTION OF THE DRAWINGS

These and other aspects, features and advantages of the present principles will become apparent from the following description in connection with the accompanying drawings given by way of example and not limiting the scope of protection, and in which.

The components in the figures are not necessarily to scale, emphasis instead being placed upon illustrating the present principles.

DESCRIPTION OF EMBODIMENTS

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1A:
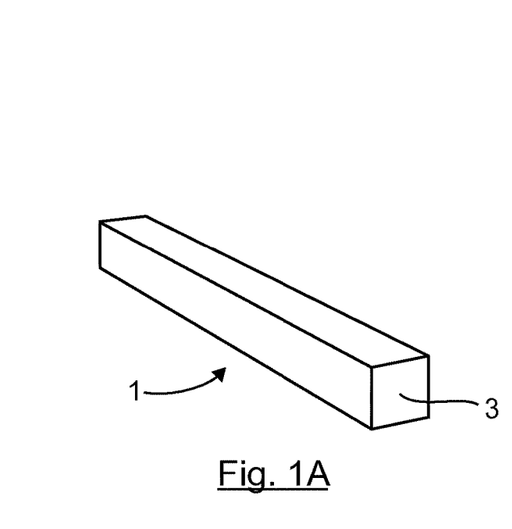
FIGS. 1A-1C are different views schematically illustrating a retractable display device according to the present principles when the display screen is rolled inside the housing, partially deployed and fully deployed respectively.
Figure 1B:
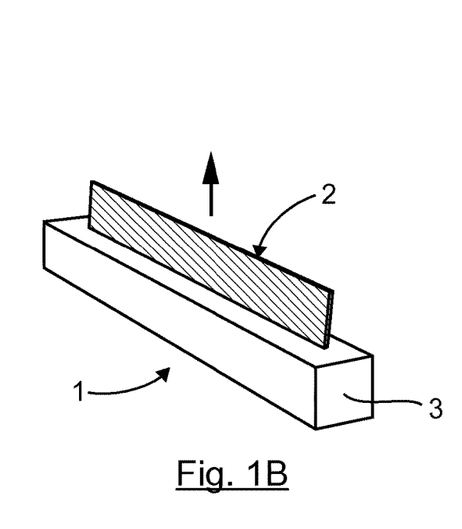
Figure 1C:
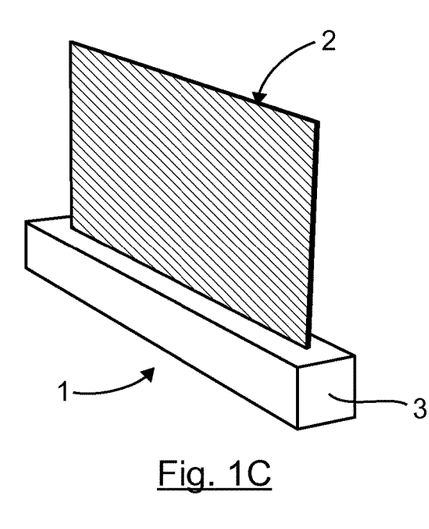

FIGS. 1A to 1C are schematic views of a retractable display device 1 according to the present principles.

Retractable display device 1 is preferably a compact, lightweight, self-powered apparatus configured to display still and video images on a retractable display screen 2 for one or more viewers.

The retractable display device 1 may include a self-contained power source (e.g. a battery) and a controller (not shown) configured to control display of the images.

Retractable display device 1 can preferably operate for extended periods without an external power source.

In some embodiments, retractable display device 1 includes speakers, and in other embodiments, external speakers are used to provide sound.

The retractable display device 1 that preferably is portable and lightweight and has a large display area.

The retractable display device 1—for instance, a TV system—includes a box or housing 3 having an internal space 31 defined therein (shown in FIGS. 3A and 3B for instance) arranged to receive the display screen 2 rolled inside.

A rolling member or axle 32 is positioned in the internal space 31 (in FIGS. 3A and 3B) of the housing 3 and is configured to have the display screen 2 rolled therearound.

The housing 3 may be a sound bar with the display screen 2 rolled inside.

The display screen 2 is configured to display images and to be rolled and unrolled directly around the axle 32.

FIG. 1A shows the retractable display device 1 when the display screen 2 is rolled inside the housing 3 around the rolling axle 32.

FIGS. 1B and 1C show the retractable display device 1 when the display screen 2 is partially deployed and fully deployed respectively in viewing configurations.

A driving device, such as a motor, a gear, a power source, etc. for electrically rotating the axle 32 may be included within the internal space 31 of the housing 3.

The display screen 2 comes out of the housing 3 upward and goes back into the housing 3 downward depending on the direction of rotation of the axle 32.

Figure 3A:
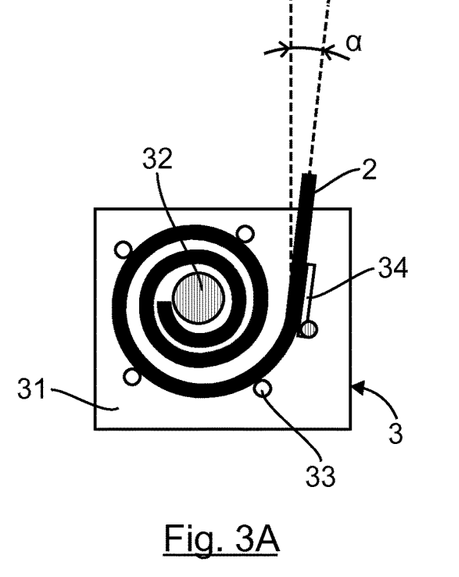
FIGS. 3A-3B are schematic section views showing the unrolling of the display screen of the retractable display device according to the present principles.
Figure 3B:
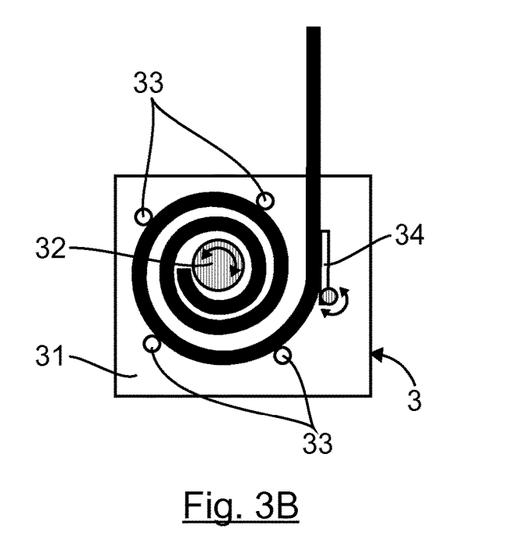

For example, as shown in FIG. 3B, when the axle 32 rotates in the anti-clockwise direction, the display screen 2 rolls out and comes out of the internal space 31 of the housing 3. By contrast, when the axle 32 rotates in the clockwise direction, the display screen 2 goes back into housing 3.

Figure 2A:
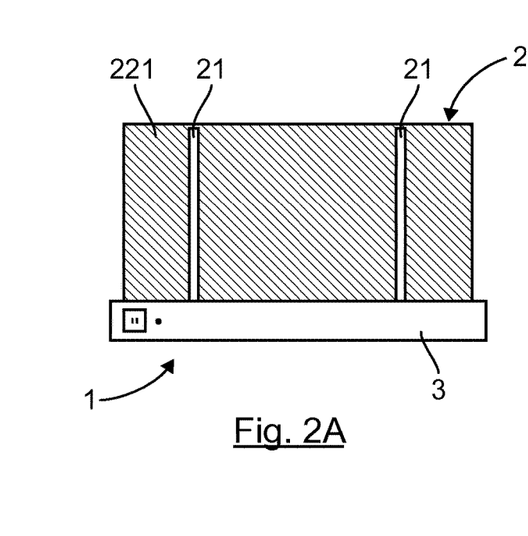
FIGS. 2A-2C are schematic views illustrating different embodiments of the retractable display device according to the present principles.
Figure 2B:
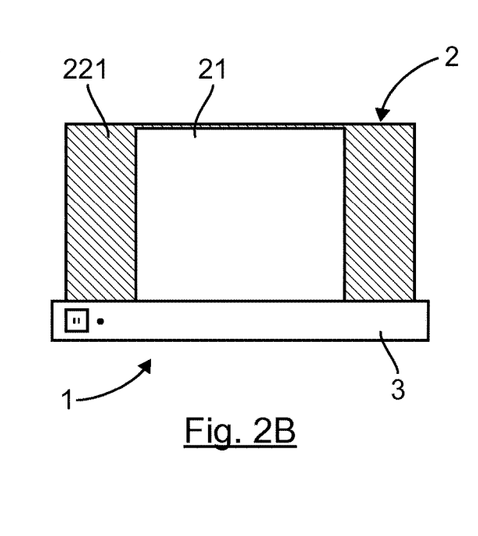
Figure 2C:
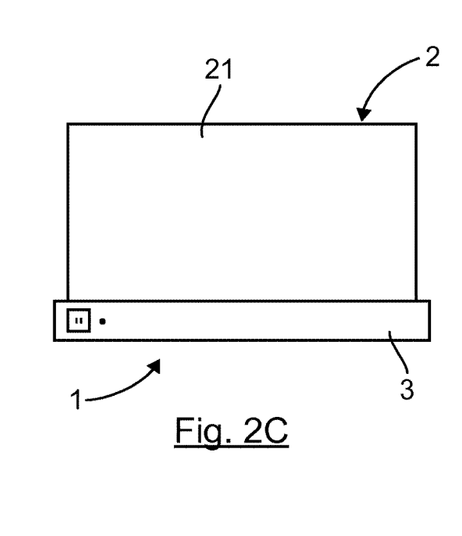

The rollable display screen 2 includes a display surface that displays an image and a support structure 21 (in FIGS. 2A-2C). As will be described in detail below, the display surface may be defined by a flexible display panel (first embodiment) or by a set of light modules supported by a plurality of support elements of the support structure 21 (second embodiment).

The support structure 21 acting as a spine makes the rollable display screen 2 stiff and flat when deployed vertically from bottom to top.

In other words, the support structure 21 acts as a strengthening device, supporting the vertical integrity of the display screen 2, and ensuring that it remains rigid and upright without the tendency to fall. This support structure 21 also makes it easy to roll the display screen 2 up and down.

It is to be noted that the display screen may also be hung up and deployed vertically from top to bottom in that case.

Figure 5:
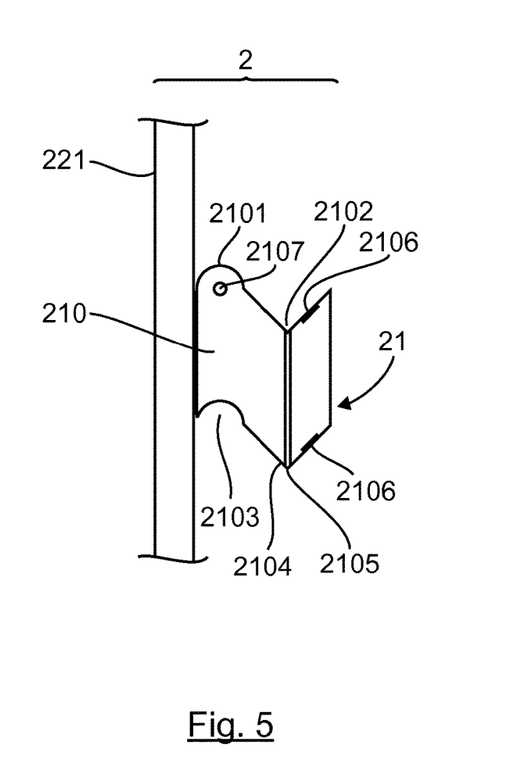
FIG. 5 is a side view schematically illustrating part of a display screen according to a first embodiment of the present principles.

In a first embodiment (FIGS. 5 and 8B), the display screen 2 includes a flexible electronic display panel 221 having a front display surface for displaying visual information, the support structure 21 capable of supporting the flexible display panel 221 including a plurality of support or spinal elements 210 being juxtaposed on the rear surface, opposite to the front surface of the flexible panel 221.

The flexible electronic display panel 221 and the support elements 210 forming the display screen 2 are capable of being wound or rolled around the axle 32 for storage and transport. The support structure 21 is thus located on the rear surface of the display panel 221 and extends between the upper and lower edges of the display panel 221 so as to give rigidity to the foldable flexible display panel 221 when the latter is deployed or partially deployed. The support structure 21 can be hidden from view when the display screen 2 is deployed.

The support structure 21 may in that case include two or more parallel spaced bars located on the rear side of the display panel 221 as illustrated in FIG. 2A showing the back of the display screen 2 when fully deployed. Each vertical bar includes a plurality of juxtaposed support elements 210.

Figure 4A:
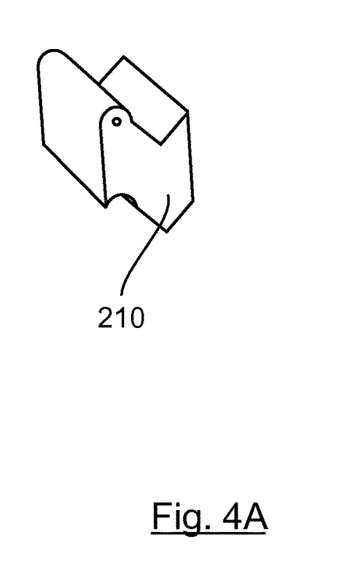
FIGS. 4A-4B are schematic views showing different shapes of the support elements adapted to support the display screen of the retractable display device according to the present principles.

The shape of such support elements 210 is shown in FIG. 4A.

Alternatively, the support structure 21 may include a web, as illustrated in FIG. 2B showing the back of the display screen 2 when fully deployed, having a width inferior to the width of the display panel 221 and including a plurality of elongated juxtaposed support elements 210.

Figure 4B:
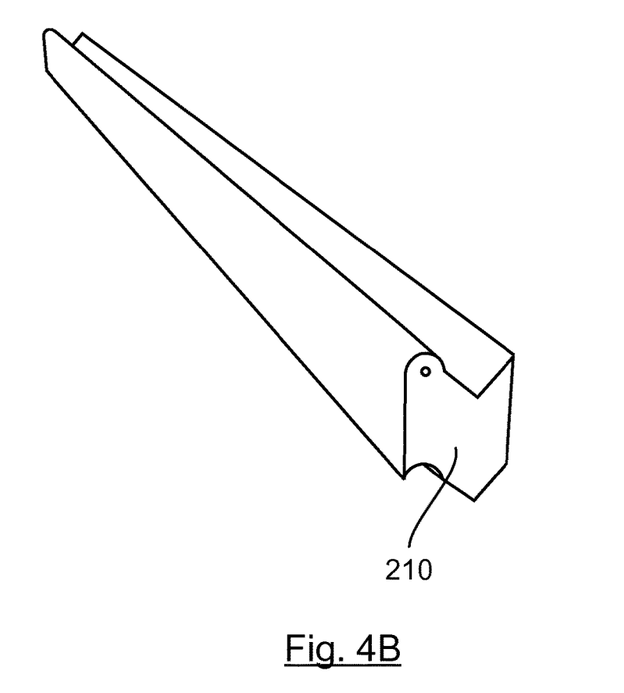

An example of shape of such support elements 210 is shown in FIG. 4B.

The support structure 21 is capable of supporting the flexible display panel 221 and is configured to deploy the latter vertically from bottom to top as a substantially planar viewing surface, in a way that does not unduly stress, fatigue, or crease the display panel 221.

In an alternative embodiment depicted in FIG. 2C showing the back of the display screen 2 when fully deployed, the support structure 21 includes a plurality of elongated support elements 210 with built-in light elements, such as LEDs, the shape of such support elements 210 being shown in FIG. 4B.

Figure 7A:
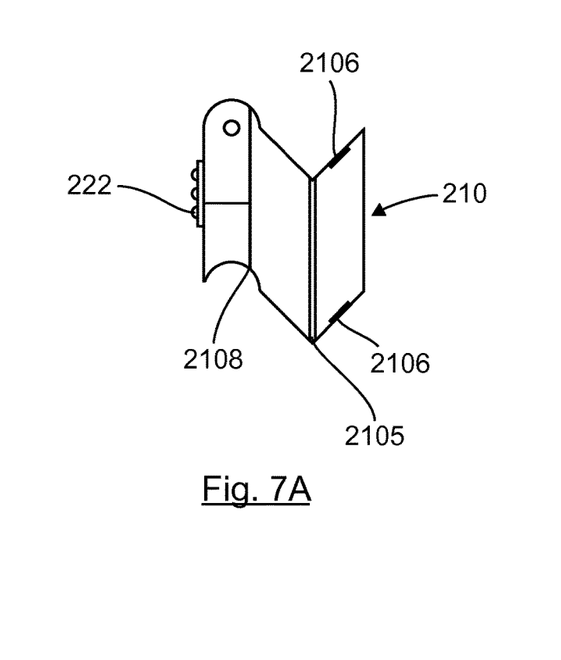
FIGS. 7A-7B are side views illustrating part of a display screen according to a second embodiment of the present principles.
Figure 7B:
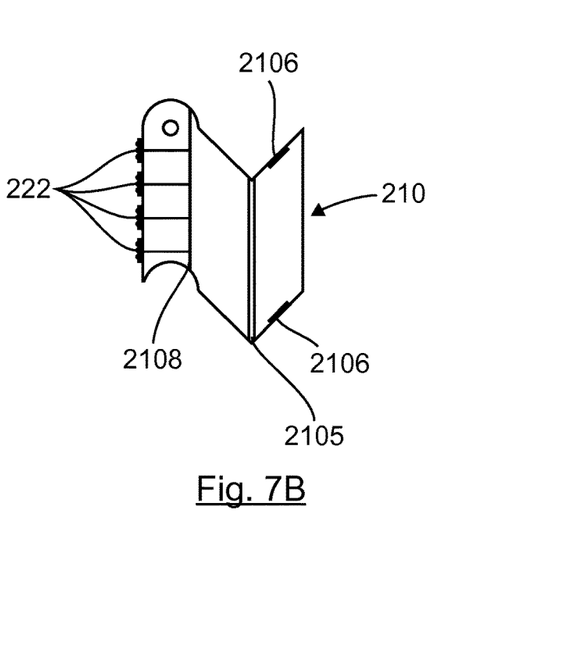
Figure 8A:
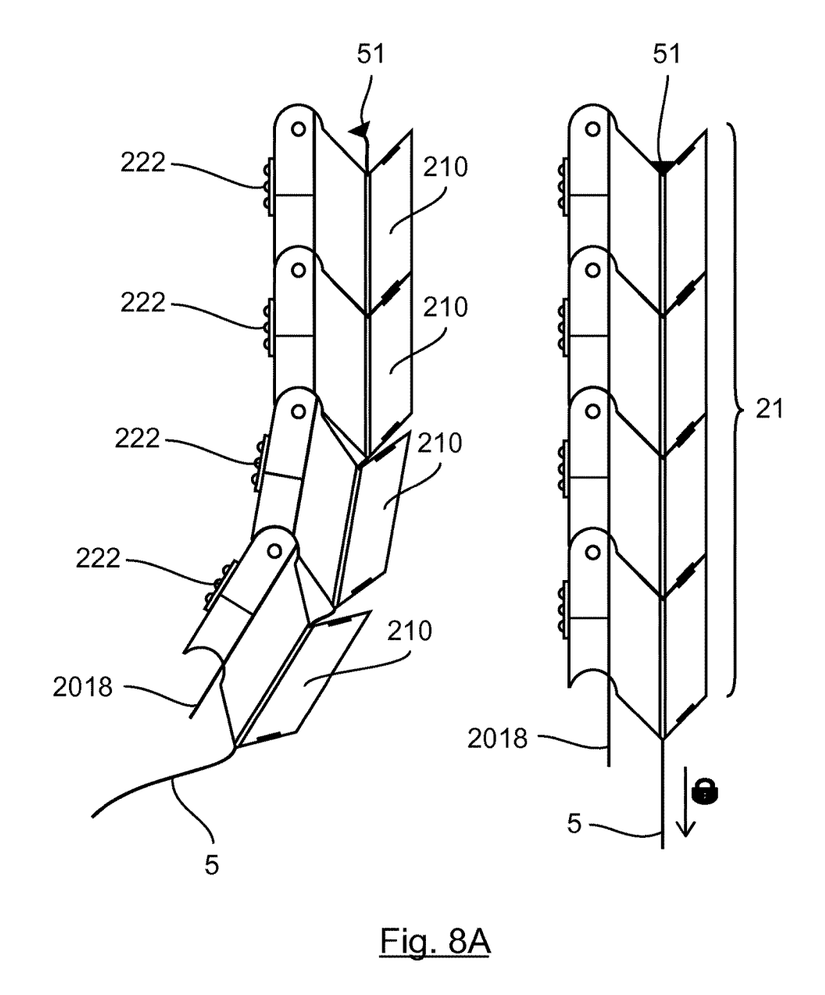
FIG. 8A shows the operation of a tension cable used in the display screen according to the first embodiment of the present principles.

There may be one or more light elements, e.g. a row or a grid (4 by 4 matrix for instance) of LED modules 222, on the front surface of each support element 210. This is shown in FIGS. 7A, 7B and 8A. The display screen 2 thus includes a set of support elements 210 on which are mounted one or more LED modules 222 forming pixel elements, all of the LED modules 222 of the support elements 210 defining the display surface.

In the embodiments described above, the LED is used as the display screen device. However, light elements other than LEDs, such as LCDs or OLEDs, and the like may be used as the image source.

LED modules can be tri-color RGB modules or single-color modules.

This approach requires the implementation of a LED control electric cable 2108 capable of providing electric current to each of the light element(s) of the support structure 21.

FIGS. 3A and 3B are schematic section views of the screen housing 3 illustrating the means for rolling and unrolling the display screen 2 including the support structure and the display panel (first embodiment) or the light elements (second embodiment).

The rollable display screen 2 is mechanically coupled to a roller mechanism located inside the internal space 31 of the housing 3. The roller mechanism is configured as a stowing mechanism for the rollable display screen 2 and to deploy the rollable display screen 2 outside of the housing 3 body whenever required as a substantially planar viewing surface. Hence, in the working state, the display screen 2 is unrolled (in the deployed in-use state of FIG. 1C) and the display surface expands outward.

It is to be noted that the display screen 2 may be partially unrolled and deployed. The size of the display screen 2 is thus adjustable according to the intended applications and programs. In that partially unrolled state, only the light elements that are located outside the housing 3 may be selected and activated.

The display screen 2 can be collapsed and stored in the housing 3 body by rolling around the axle 32 whenever required. In that position, the display device 1 may be used to play music.

A plurality of movable guides such as rollers 33 are located inside the internal space 31 of the housing 3. These rollers 33 are configured to retract and compactly stow display screen 2 when not in use. Rollers 33 prevent any folding or creasing of display screen 2 and ensures that display screen 2 is correctly rolled inside the housing 3.

When the display screen 2 is deployed outside the housing 3, the rollers 33 are configured to guide the display screen 2 smoothly out of the housing 3.

A motorized rotating screen guide 34 is also located inside the housing 31 near the opening (not shown) of the housing 3 through which the display screen 2 comes out.

When the display screen 2 is unrolled out of the housing 3, this guide 34 is inclined so that the display screen comes out inclined by an angle of $\alpha°$ (FIG. 3B) to let the gravity rigidify the display screen 2 structure. The display screen 2 and its support structure 21 are flexible in only one direction.

When the display screen 2 is fully out, the rotating screen guide 34 is positioned vertically so the support structure 2 gets back to vertical. Before or after this step, another mechanism (i.e. tension cable 5) may lock the display screen 2 straight as will be explained below.

The cross-section of the support elements 210 according to an embodiment is illustrated in FIGS. 5, 7A to 8B.

Each support element 210 includes on its upper edge a semi-circular lip 2101 and a groove 2102 of triangular cross-section extending longitudinally. The angle between the inclined surfaces of the groove 2102 is equal to 90° for instance. The lip 2101 is on the side of the display panel 221 or the light modules 222.

Each support element 210 includes on its lower edge a semi-circular notch 2103 and a tip 2104 of triangular cross-section extending longitudinally. The angle between the inclined surfaces of the tip 2104 is equal to 90° for instance. The notch 2103 is on the side of the display panel 221 or the light modules 222.

The construction of the support elements 210 is not complex (this decreases the cost associated with the display device).

The support elements 210 are made up of hard plastic for instance.

The upper edge of each support element 210 is configured to fit into the lower surface of the support element 210 located above when the display screen is erected. The lower edge of each support element 210 is also configured to fit into the upper surface of the support element 210 located below when the display screen 2 is erected fully or partially.

More precisely, the tip 2104 of a support element 210 is configured to fit into the groove 2102 of an adjacent support element 210 when the display screen 2 is erected fully or partially. The lip 2101 of a support element 210 is also configured to fit into the notch 2103 of an adjacent support element 210 when the display screen 2 is erected fully or partially.

There is no contact between the tip 2104 and groove 2102, or between the lip 2101 and notch 2103, of adjacent support elements 210 when the display screen 2 is rolled inside the housing 3.

Figure 8B:
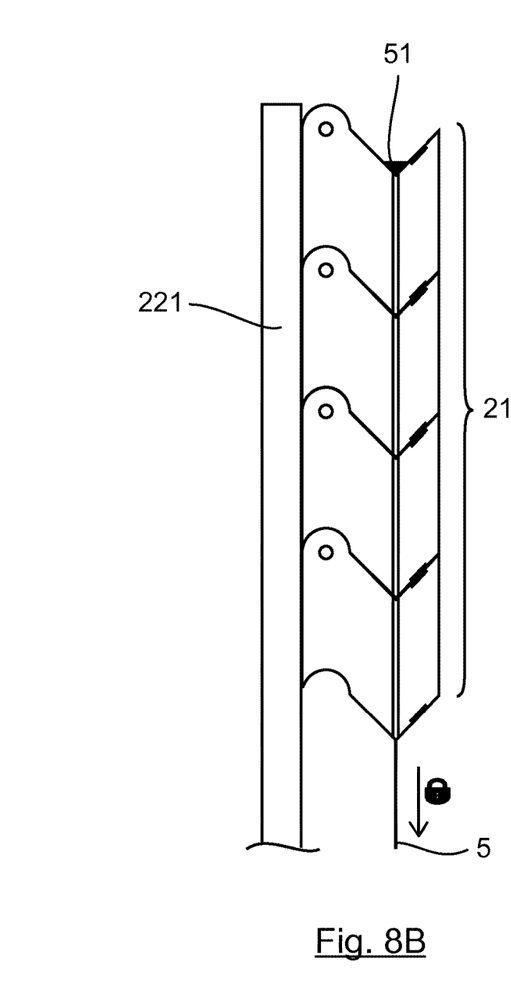
FIG. 8B shows the operation of a tension cable used in the display screen according to the second embodiment of the present principles.

In the first embodiment shown in FIG. 8B, the display panel 221 is made up of a flexible, rollable material. The support elements 210 are attached to the rear surface of the display panel 221 by gluing, adhesive tape or clips for instance. The shape of the support elements 210 ensures that they fit into each other when the display screen 2 is erected. The display panel 221 may ensure by itself the link between the support elements 210. In addition, additional links may be provided between the support elements 210.

In the second embodiment shown in FIG. 8A, the support elements 210 are linked and articulated by lateral chains or lateral clips (not shown).

In the deployed and locked position of the display screen 2, the support elements 210 are aligned along a vertical axis.

In the storage position of the display screen 2, the support elements 210 are rolled around the axle 32.

The right angle between the inclined surfaces of the tip 2104 and between the inclined surfaces of the groove 2102 maximizes blocking contacts between adjacent support elements 210 and allows to free the support elements 210 when the structure is bent during stowing inside the stowing 3.

In both embodiments, two attractive magnets 2106 are located on opposite upper and lower edges of each support element 210 of the support structure 21.

These magnets 2106 are designed to improve the deployment stability of the display screen 2. When two adjacent support elements 210 are aligned vertically, they are stuck to each other by the cooperation of the magnets 2106 facing each other.

When the display screen 2 is rolled inside the housing 3, the bending force applied on the support elements 210 releases the cooperation of the magnets.

The magnets 2106 are optional and should be magnetically isolated to not pollute the surrounding electrical components. The magnets 2106 may be electromagnets that are enabled when the display screen 2 is fully deployed.

One or more tension cable tunnels 2105 may be defined in each of the support elements 210 of the support structure 21. The tunnel 2105 extends between the bottom of the groove 2102 and the top of the tip 2104 of each support element 210. This tunnel 2105 is made for a tension cable 5 that locks the deployed display screen 2 straight in the vertical or fully deployed position. There can be a plurality of cables (and tunnels) depending on the support structure dimensions.

The number of tension cables 5 (and thus of tunnels 2105) depends on the width of the display screen 2.

The magnets 2106 may be disabled when the display screen 2 is fully deployed and the tension cable(s) locked.

Figure 6:
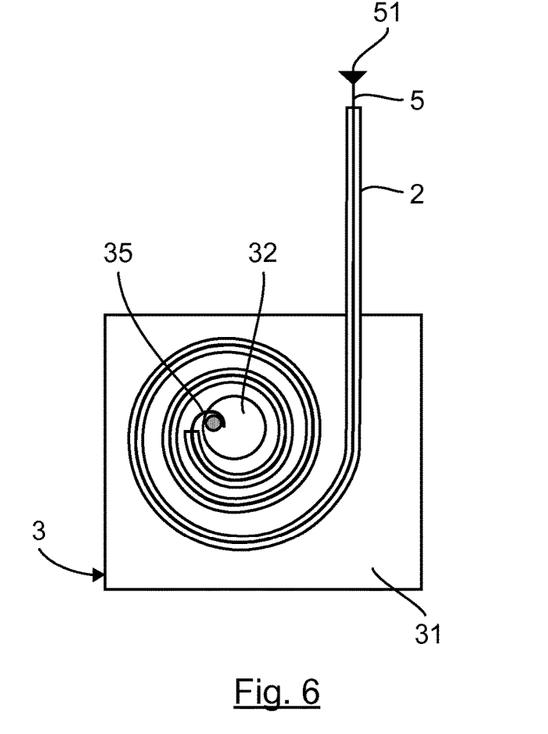
FIG. 6 is a schematic section view showing the structure of a tension cable which may be used in the display screen of the retractable display device according to the present principles.

FIGS. 8A and 8B illustrate how the tension cable 5 and magnets work 2106. When the tension cable 5 is tight, the support elements 210 are forced against each other and thus the support structure 21 is locked in the straight vertical position. To get the display screen 2 back into the housing 3, the support structure 21 must be unlocked. The pulling and release of the tension cable(s) 5 is implemented by a cable pulling releasing device 35 (FIG. 6) which is mechanically coupled to an edge of the display screen 2 and to the axle 32. A tension cable stop 51 is provided at one end of the cable 5 and comes into contact with the upper edge of the upper support element 210 when the display screen 2 is erected.

The roller guides 33, magnets 2106 and tension cable(s) 5 are configured to maintain a desired tension in the supporting structure 21, so that the display screen 2 provides a substantially planar viewing surface and therefore a higher quality image for viewers.

The tension of the cable 5 may be adjustable so that the rigidity of the display screen 2 may be adjusted when unrolled out of the housing 3.

The main steps for deploying the display screen 2 are as follows:

Step 1—Open the trap door (if any) of the housing 3,
Step 2—Switch on the display screen 2 and display a video stream,
Step 3—Incline the screen guide 34,
Step 4—Release the tension cable(s) 5,
Step 5—If electromagnets 2106 are implemented, turn them on,
Step 6—Unroll the display screen 2 out of the box 3,
Step 7—When the display screen 2 is fully out, pull the tension cable 5,
Step 8—Position the screen guide 34 vertically,
Step 9—If electromagnets 2106 are implemented, turn them off,
Step 10—If not already done, switch on the display screen 2.

To put the display screen 2 back into the housing 3, the steps above are implemented in the reverse order.

The present principles can thus provide a large screen display device that can be rolled, so as to reduce the size of the display device when the screen is not deployed, such as a television.

The display screen can be stored in a compact shape that facilitates shipping and transport of the display device, and may be readily erected at a location (e.g., an office lobby or waiting area, a meeting space, a hospitality area, a restaurant, a bar, a store, etc.) to effect a desired display function.

The self-erecting display device may be used to communicate text and/or stationary or animated images to large audiences for instance (it may be used as a projector for instance).

Many other variations and modifications will be apparent to those skilled in the art.

In the illustrated embodiments, the support elements have an upper edge including a semi-circular lip and a triangular groove and a lower edge including a semi-circular notch and a triangular tip.

In another embodiment, the support elements may have an upper edge including a semi-circular notch and a triangular tip and a lower edge including a semi-circular lip and a triangular groove.

The shape of the lip, groove, notch and tip of each support element is not limited to the ones illustrated.

The shape of the support elements is chosen so as to reduce friction between adjacent support elements and optimize the blocking of the support elements with one another.

All examples and conditional language recited herein are intended for pedagogical purposes to aid the reader in understanding the present principles and the concepts contributed by the inventor to furthering the art, and are to be construed as being without limitation to such specifically recited examples and conditions, nor does the organization of such examples in the specification relate to a showing of the superiority and inferiority of the present principles. Although the embodiments of the present principles have been described in detail, it should be understood that the various changes, substitutions, and alterations could be made hereto without departing from the spirit and scope of the present principles.

The invention claimed is:

1. A retractable display device comprising a housing having an internal space defined therein, a rolling axle positioned in the housing, an electronic display comprising a front surface and a rear surface opposite the front surface, and a support structure attached to the rear surface of the electronic display and capable of supporting the electronic display, wherein the support structure extends between upper and lower edges of the electronic display and is positioned within the periphery of the electronic display, and comprises a plurality of juxtaposed support elements being capable of being rolled around the axle with the electronic display in a storage position and of being unrolled upward, at least partially out of the housing, to provide a substantially planar display surface on which visual information may be displayed, and wherein the support structure is hidden from view when the front display surface is at least partially out of the housing;

wherein a first edge of each of the support elements comprises a groove having a triangular section and extending longitudinally, the second opposite edge comprising a tip having a triangular section and extending longitudinally, the tip of a support element being configured to fit into the groove of an adjacent support element when the support structure and electronic display are deployed at least partially out of the housing; and     wherein the angle between the inclined surfaces of the groove and the angle between the inclined surfaces of the tip are each substantially equal to 90°.

2. The retractable display device of claim 1, wherein the support structure comprises one supporting bar or a plurality of parallel supporting bars extending vertically on the rear surface of the electronic display when unrolled, each of the supporting bars comprising the plurality of juxtaposed support elements.

3. The retractable display device of claim 1, wherein the support structure comprises a supporting web extending vertically on the rear surface of the electronic display when unrolled, the supporting web comprising the plurality of juxtaposed support elements.

4. The retractable display device of claim 1, wherein each of the support elements carries at least one light element, the set of light elements of the support structure defining the display surface.

5. The retractable display device of claim 4, wherein each of the support elements carries a matrix of light elements.

6. The retractable display device of claim 4, wherein the juxtaposed support elements are joined or connected together by linking elements.

7. The retractable display device of claim 1, wherein the support elements carry magnets on opposite upper and lower edges for straightening the support structure by magnetic force when the support structure is deployed.

8. The retractable display device of claim 1, further comprising a pullable tension cable extending through an opening in each of the support elements to affix the latter together when the support structure is deployed out of the housing.

9. The retractable display device of claim 1, wherein the housing comprises a rotating guide capable of guiding upward with an inclination the electronic display and support structure when unrolled out of the housing.

10. The retractable display device of claim 1, wherein the housing comprises a plurality of movable guides located around the axle and configured to retract and compactly stow support structure and the electronic display when rolled inside the housing.

11. The retractable display device of claim 1, wherein the shape of the upper and lower edges of each of the support elements is configured so that the juxtaposed support elements fit into each other when the support structure and the electronic display are deployed at least partially out of the housing.

12. The retractable display device of claim 1, wherein the first edge of each of the support elements also comprises a lip having a semi-circular section and extending longitudinally, the second opposite edge also comprising a notch having a semi-circular section and extending longitudinally, the lip of a support element being configured to fit into the notch of an adjacent support element when the support structure and electronic display are deployed at least partially out of the housing.

13. A retractable display device comprising a housing having an internal space defined therein, a rolling axle positioned in the housing, an electronic display comprising a front surface and a rear surface opposite the front surface, and a support structure attached to the rear surface of the electronic display and capable of supporting the electronic display, wherein the support structure extends between upper and lower edges of the electronic display and is positioned within the periphery of the electronic display, and comprises a plurality of juxtaposed support elements being capable of being rolled around the axle with the electronic display in a storage position and of being unrolled upward, at least partially out of the housing, to provide a substantially planar display surface on which visual information may be displayed, and wherein the support structure is hidden from view when the front display surface is at least partially out of the housing;

wherein a first edge of each of the support elements comprises a groove having a triangular section and extending longitudinally, the second opposite edge comprising a tip having a triangular section and extending longitudinally, the tip of a support element being configured to fit into the groove of an adjacent support element when the support structure and electronic display are deployed at least partially out of the housing; and     wherein the first edge of each of the support elements also comprises a lip having a semi-circular section and extending longitudinally, the second opposite edge also comprising a notch having a semi-circular section and extending longitudinally, the lip of a support element being configured to fit into the notch of an adjacent support element when the support structure and electronic display are deployed at least partially out of the housing.

14. The retractable display device of claim 13, wherein the support structure comprises one supporting bar or a plurality of parallel supporting bars extending vertically on the rear surface of the electronic display when unrolled, each of the supporting bars comprising the plurality of juxtaposed support elements.

15. The retractable display device of claim 13, wherein the support structure comprises a supporting web extending vertically on the rear surface of the electronic display when unrolled, the supporting web comprising the plurality of juxtaposed support elements.

16. The retractable display device of claim 13, wherein each of the support elements carries at least one light element, the set of light elements of the support structure defining the display surface.

17. The retractable display device of claim 16, wherein the juxtaposed support elements are joined or connected together by linking elements.

18. The retractable display device of claim 13, wherein the support elements carry magnets on opposite upper and lower edges for straightening the support structure by magnetic force when the support structure is deployed.

19. The retractable display device of claim 13, further comprising a pullable tension cable extending through an opening in each of the support elements to affix the latter together when the support structure is deployed out of the housing.

20. The retractable display device of claim 13, wherein the angle between the inclined surfaces of the groove and the angle between the inclined surfaces of the tip are each substantially equal to 90°.

\* \* \* \* \*